United States Patent
Chen et al.

(10) Patent No.: US 8,468,516 B1
(45) Date of Patent: Jun. 18, 2013

(54) CREATING HOT PATCHES FOR EMBEDDED SYSTEMS

(75) Inventors: Tian Chen, Beijing (CN); Yu Jia, Beijing (CN); ZhenYing Li, Beijing (CN); Haiyu Wang, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 1158 days.

(21) Appl. No.: 12/354,824

(22) Filed: Jan. 16, 2009

Related U.S. Application Data

(60) Provisional application No. 61/139,328, filed on Dec. 19, 2008.

(51) Int. Cl.
G06F 9/44 (2006.01)
G06F 17/00 (2006.01)

(52) U.S. Cl.
USPC ........... 717/170; 717/162; 717/168; 717/169; 717/171; 707/687

(58) Field of Classification Search
None
See application file for complete search history.

(56) References Cited

U.S. PATENT DOCUMENTS

| | | | | |
|---|---|---|---|---|
| 5,901,225 | A * | 5/1999 | Ireton et al. | 714/6.32 |
| 6,230,316 | B1 * | 5/2001 | Nachenberg | 717/169 |
| 6,526,574 | B1 * | 2/2003 | Jones | 717/168 |
| 6,651,249 | B2 * | 11/2003 | Waldin et al. | 717/170 |
| 6,925,467 | B2 * | 8/2005 | Gu et al. | 707/687 |
| 7,185,332 | B1 * | 2/2007 | Waldin et al. | 717/170 |
| 7,661,102 | B2 * | 2/2010 | Ogle | 717/168 |
| 7,669,197 | B1 * | 2/2010 | O'Neill et al. | 717/172 |
| 7,716,661 | B2 * | 5/2010 | Paul et al. | 717/173 |
| 7,779,401 | B2 * | 8/2010 | Scian et al. | 717/168 |
| 7,958,502 | B2 * | 6/2011 | Motta et al. | 717/168 |
| 2006/0039618 | A1 * | 2/2006 | Ogle | 382/236 |
| 2006/0080681 | A1 * | 4/2006 | Anwar et al. | 719/331 |
| 2007/0067765 | A1 * | 3/2007 | Motta et al. | 717/168 |
| 2007/0132774 | A1 * | 6/2007 | Fan et al. | 345/564 |
| 2007/0169093 | A1 * | 7/2007 | Logan et al. | 717/168 |
| 2007/0294683 | A1 * | 12/2007 | Lee et al. | 717/162 |
| 2008/0098160 | A1 * | 4/2008 | Slyz et al. | 711/103 |
| 2009/0070374 | A1 * | 3/2009 | Eker et al. | 707/104.1 |
| 2009/0187725 | A1 * | 7/2009 | Mencias et al. | 711/171 |

OTHER PUBLICATIONS

Eric D. Scheirer, "External Documentation and Release Notes for saolc",[Online], Aug. 1999, pp. 1-40, [Retrieved from Internet on Feb. 10, 2013], <http://citeseerx.ist.psu.edu/viewdoc/download?doi=10.1.1.28.6031&rep=repl&type=pdf>.*

(Continued)

*Primary Examiner* — Thuy Dao
*Assistant Examiner* — Ziaul A Chowdhury
(74) *Attorney, Agent, or Firm* — Shumaker & Sieffert, P.A.

(57) ABSTRACT

A software patch is generated by determining the binary differences between a more secure version of the embedded system firmware and the currently operating, vulnerable version. The differences are extracted and analyzed to determine their basis in the source code for the more secure version. Source code that affects the binary differences may be compiled into a binary file and linked, off-line, with the binary executable file that contains the machine code for the currently operating version of the embedded system firmware, producing a security patch. The security patch may be installed on the embedded system at run-time, and it is then executed to modify the currently operating firmware to redirect firmware operation from vulnerable procedures toward the new, secure procedures contained in the software patch.

13 Claims, 6 Drawing Sheets

OTHER PUBLICATIONS

M. Antonioletti et al., "Software Engineering and Code Development for HPC Applications", [Online], 2000, pp. 1-87, [Retrived from Internet on Feb. 10, 2013], <http://citeseerx.ist.psu.edu/viewdoc/download?doi=10.1.1.126.8459&rep=repl&type=pdf>.*

Stephen KellStephen Kell, "A Survey of Practical Software Adaptation Techniques", [Online], 2008, pp. 2110-2157, [Retrieved from Internet on Feb. 10, 2013], <http://www.jucs.org/jucs_14_13/a_survey_of_practical/jucs_14_13_2110_2157_kell.pdf>.*

Jacky Estublier et al., "Impact of Software Engineering Research on the Practice of Software Configuration Management", [Online], ACM 2005, pp. 1-48, [Retrieved from Internet on Feb. 10, 2013], <http://www-adele.imag.fr/Les.Publications/journals/ImpactSCM-Final-Tosem.pdf>.*

Santosa, Mulyadi, "Understanding ELF Using Readelf and Objdump" WWW.Linuxforums.org Jun. 16, 2006 (7 Pages).

Felser, Meik et al., "Dynamic Software Update of Resource-Constrained Distributed Embedded Systems", International Federation for Information Processing, vol. 231, pp. 387-400, May 5, 2007.

* cited by examiner

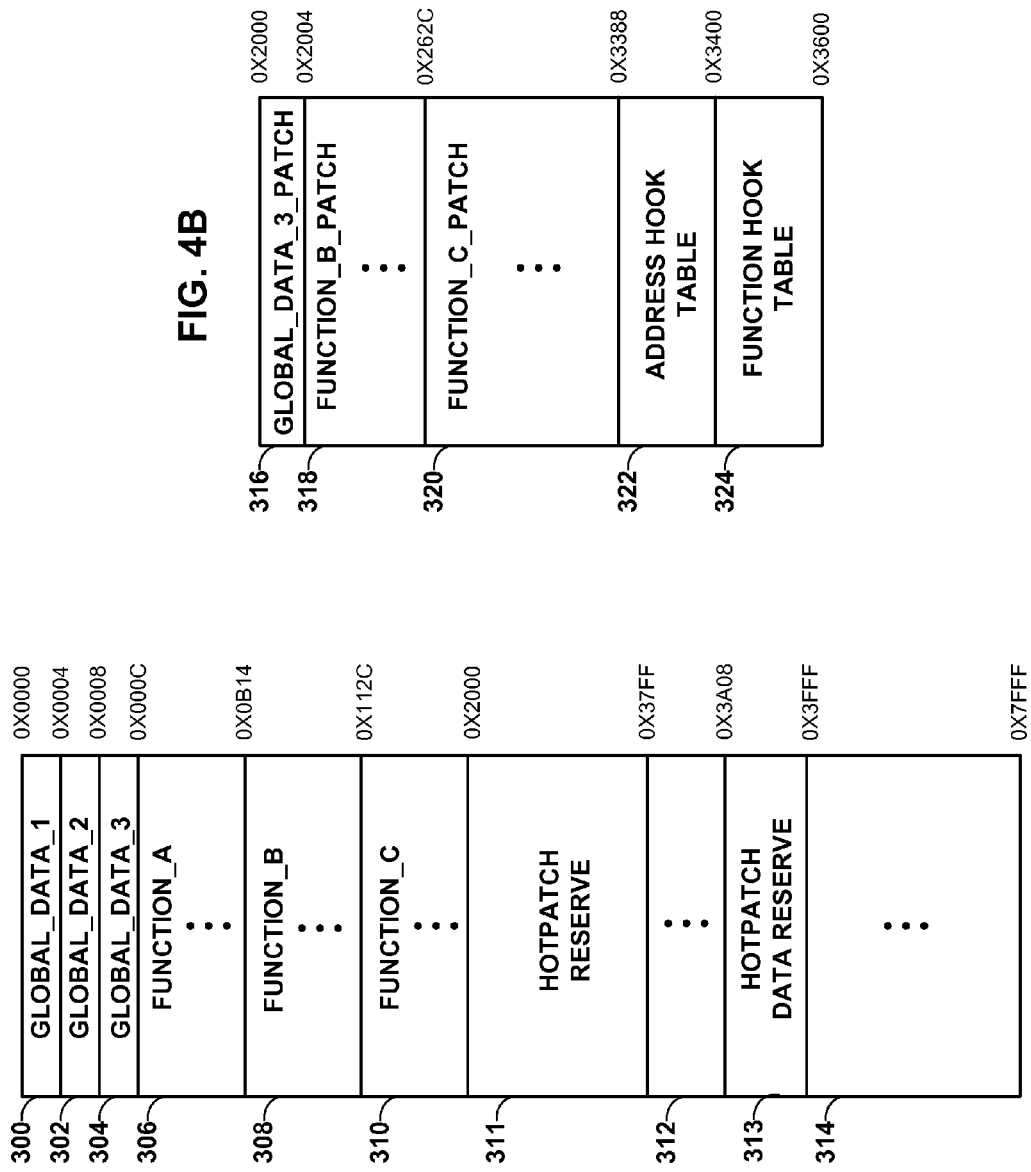

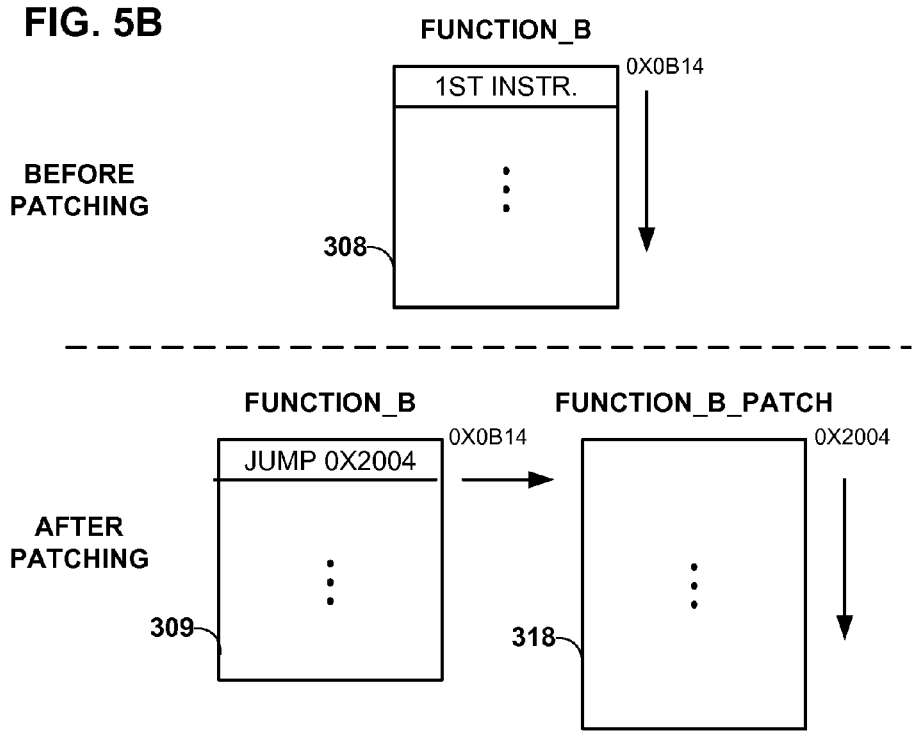

CREATING HOT PATCHES FOR EMBEDDED SYSTEMS

This application claims the benefit of U.S. Provisional Application No. 61/139,328, filed Dec. 19, 2008, the entire content of which is incorporated herein by reference.

TECHNICAL FIELD

The invention relates to embedded systems, and, more particularly, to generating software updates for embedded systems.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. These services and communication protocols expose the network to security vulnerabilities.

Network administrators deploy security appliances that mitigate vulnerabilities by analyzing inbound and outbound network traffic for known network attack signatures. In addition, such appliances may implement a predetermined set of policies regarding port usage, permissible protocols, access control, and the like. While firewalls are the most common security appliances, the category includes IPSec/VPN devices, proxy servers, and other intrusion detection systems (IDS) and intrusion prevention systems (IPS).

These security appliances are generally implemented as embedded systems, i.e., devices having internal processes, firmware and other computing functions that control the operation of the device. The firmware controlling the operation of a security appliance or other embedded system may contain its own vulnerabilities, such as buffer overrun vulnerabilities, dangling pointers, input validation mishandling, allowing code injection, and others that open the security appliance to exploit. These vulnerabilities, when discovered, must be quickly resolved in order to prevent unintended and unanticipated behavior by the security appliance as a result of an attack. Replacing the firmware with a new release that resolves the vulnerabilities, however, may require taking the security appliance offline to perform the installation. Because the network no longer has the intrusion detection and prevention protection provided by the security appliance during this time, inbound and outbound traffic will likely be halted by the network administrators, frustrating the goal of maximizing network availability.

SUMMARY

In general, techniques are described for on-line resolution of firmware vulnerabilities in security appliances. More particularly, use of the techniques described herein produces a security patch that may be used by a security appliance to supplant portions of firmware currently installed and operating on the appliance. The security patch, or "hot patch," can be installed while the firmware is operating without interrupting the security functions of the appliance. This obviates the need for device shutdown, execution suspension, or rebooting, thereby permitting continuous operation by the security appliance and maximizing network availability.

The hot patch is generated by determining the binary differences between a more secure version of the security appliance firmware and the currently operating, vulnerable version. The differences are extracted and analyzed to determine their basis in the source code for the more secure version. Portions of the source code that affect the binary differences may be compiled into a binary file and linked, off-line, with the binary executable file that contains the machine code for the currently operating version of the security appliance firmware, producing a hot patch. The hot patch may be installed on the security appliance at run-time, and it is then executed to modify the currently operating firmware to redirect firmware operation from vulnerable procedures toward the new, secure procedures contained in the hot patch.

Further, the hot patch is generated to include an address hook table that may be used during hot patch installation to map firmware operation from vulnerable software procedures to new, secure software procedures at runtime, i.e., while the vulnerable firmware continues to be executed by the device. The address hook table can also be used to roll back the hot patch after installation in the event the security appliance administrator determines that the modifications resulted in undesirable operation.

In one embodiment, the invention is directed to a method for determining the differences between an updated version of embedded system firmware and a prior version of the embedded system firmware by comparing symbols within the updated version and symbols within the prior version, wherein the updated version and the prior version of the embedded system firmware comprise executable machine instructions compiled from source code, and wherein the symbols represent data or functions within the firmware, and generating a software patch based on the determined differences.

In another embodiment, the invention is directed to a method for reading an entry from an address hook table in a software patch in a main memory of an embedded system, wherein the entry comprises a memory address of a symbol within firmware of the embedded system, original content at the memory address of the symbol, and new content, wherein the symbol represents data or a function within the firmware, and, while the firmware of the embedded system is running, copying the new content to the memory address of the symbol.

In another embodiment, the invention is directed to an embedded system comprising a software patch for firmware of the embedded system, wherein the software patch comprises an address hook table having an entry comprising a memory address of a symbol within the firmware, the original content at the memory address of the symbol, and new content, wherein the symbol represents data or a function within the firmware, and a patch management module that, while the firmware is running, copies the new content to the memory address of the symbol.

In another embodiment, the invention is directed to a computer-readable medium containing instructions. The instructions cause a programmable processor to read a record from a symbol table of a prior version of embedded system firmware, wherein the record describes a symbol within the prior version of the embedded system firmware, read a record from a symbol table of an updated version of the embedded system firmware, wherein the record describes a symbol within the updated version of the embedded system firmware that corresponds to the symbol within the prior version, compare the record of the symbol within the prior version and the record of the symbol within the updated version to determine whether the symbol is either new or modified, extract specific content from source code for the updated version when the symbol is either new or modified, compile the extracted specific content, generate an address hook table having an entry for the symbol, wherein the entry comprises a memory address of the symbol within the prior version of the embedded system firmware, the content at the memory address, and new content, and build a software patch from the compiled specific content and address hook table.

In another embodiment, the invention is directed to a computer-readable medium containing instructions. The instructions cause a programmable processor to read an entry from an address hook table in a software patch in a main memory of an embedded system, wherein the entry comprises a memory address of a symbol within the firmware of the embedded system, original content at the memory address of the symbol, and new content, wherein the symbol represents data or a function within the firmware, and, while the firmware of the embedded system is running, copy the new content to the memory address of the first symbol.

Applying a security patch in the manner herein described avoids a reboot of the appliance, shutdown, or other loss of service that is inherent in other methods of patching, particularly in the area of embedded systems. Because rebooting an appliance can often temporarily eliminate the effects, but not the cause, of a vulnerability, installing an on-line security patch may aid in the debugging process. Furthermore, the automated patch generation described avoids altering the existing development flow to account for patch generation. Software developers need only identify the cause of a vulnerability and modify the source to close it. Developers are not required to shepherd the build process of the hot patch. Finally, dynamically generating the address hook table permits the patch to be rolled back, for the firmware's original binary code is maintained in the address hook table and may be used in a restoration operation.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4A is a block diagram illustrating a memory map for an IDS.

FIG. 4B is a block diagram that illustrates a hot patch for an IDS.

FIG. 5A is a block diagram illustrating an address hook table for the memory map of FIG. 4A and the hot patch of FIG. 4B.

FIG. 5B is a block diagram illustrating function contents for a particular function symbol before and after patching.

DETAILED DESCRIPTION

Figure 1:
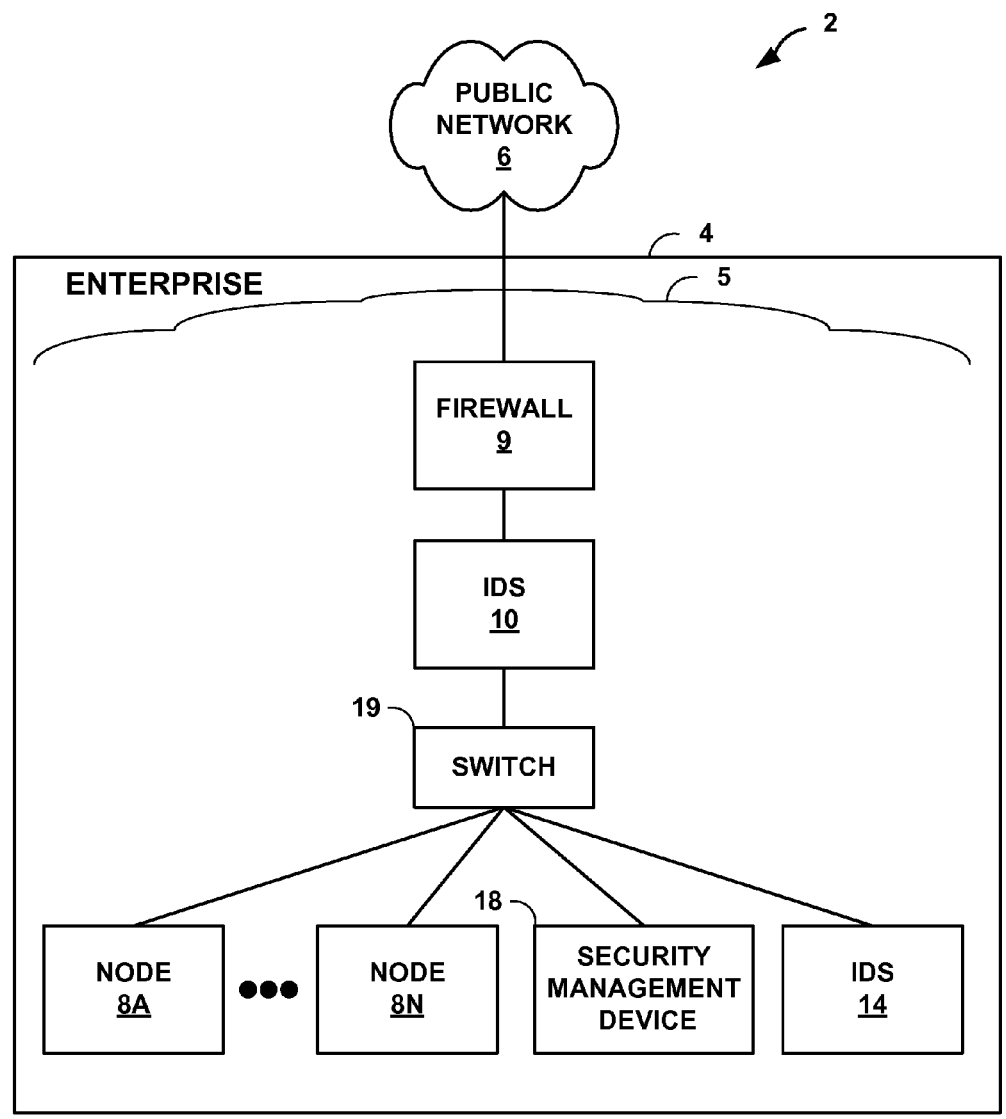
FIG. 1 is a block diagram illustrating an exemplary enterprise computer network in which an intrusion detection system ("IDS") security appliance analyzes incoming and outgoing traffic for known network attack signatures.

FIG. 1 is a block diagram illustrating an exemplary system 2 in which enterprise computer network 4 includes intrusion detection system ("IDS") 10. In the example embodiment of FIG. 1, IDS 10 is a single network device. Network 4 also includes a private enterprise computing network 5 that is coupled to public network 6, such as the Internet. Public network 6 may include, for example, one or more client computing devices. Firewall 9 protects enterprise network 5 and, in particular, internal computing nodes 8A-8N. Computing nodes 8A-8N ("computing nodes 8") represent any private computing device within enterprise network 5, including workstations, file servers, print servers, database servers, printers and other devices.

In the example of FIG. 1, enterprise network 5 includes IDS 10 that monitors traffic flowing between firewall 9 and internal computing nodes 8. As described herein, IDS 10 may analyze network traffic flowing in both directions (i.e., inbound traffic received from public network 6 as well as outbound traffic destined to the public network) to improve accuracy in detecting network attacks. That is, IDS 10 may analyze both client-to-server and server-to-client communications between public network 6 and computing nodes 8. IDS 10 may analyze the network traffic to correlate traffic in one direction with traffic in the opposite direction for each communication session detected within the network traffic. For example, for each client-server communication session, IDS may identify a packet flow in one direction (e.g., a client-to-server communication flow for a particular software application on the client) and a corresponding packet flow in the opposite direction (e.g., response communications flowing from the server to the client for that same software application).

IDS 10 supports the principles of the hot patching invention described herein. As such, an administrator may apply a security patch to the IDS while avoiding a reboot of the appliance, shutdown, or other loss of service that would otherwise impair network availability. Furthermore, although the principles of this invention are described with respect to an intrusion detection system, they are applicable to embedded systems generally. For example, a hot patch may be applied to a firewall, a hand-held device, an industrial robot, a computer peripheral device, a network router, a media player, and many other types of devices.

Figure 2:
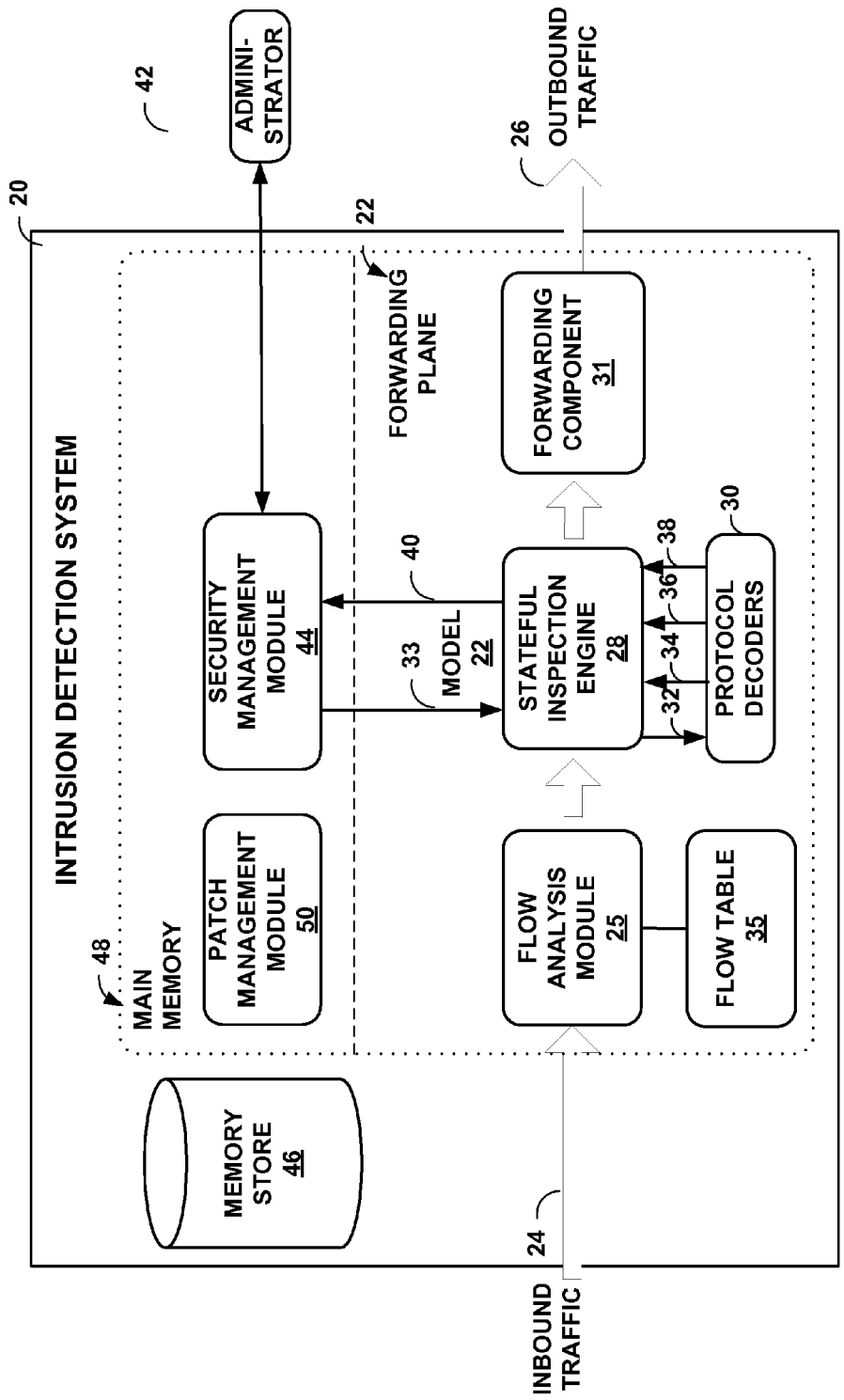
FIG. 2 is a block diagram illustrating an exemplary embodiment of an IDS in further detail.

FIG. 2 is a block diagram illustrating an example embodiment of an IDS 20. In the illustrated example, IDS 20 includes main memory 48 having a forwarding plane 22 that transparently monitors inbound network traffic 24 and forwards the network traffic as outbound network traffic 26. In the example illustrated by FIG. 2, forwarding plane 22 includes flow analysis module 25, stateful inspection engine 28, protocol decoders 30, forwarding component 31 and security management module 44.

In addition, main memory 48 includes security management module 44, which presents a user interface by which administrator 42 configures IDS 20. For example, administrator 42 may configure IDS 20 to monitor particular subnets of the enterprise network. In addition, security management module 44 presents a user interface by which administrator 42 may specify attack definitions 33, which security management module 44 relays to stateful inspection engine 28. In one embodiment, attack definitions 33 may be compound attack definitions. Moreover, security management module 44 may present a user interface by which administrator 42 may modify assumptions regarding packet flow characteristics, such as the highest priority packet flows for monitoring, port bindings for applications, or other features of determining a type of application and protocol associated with the packet flow.

Flow analysis module 25 receives inbound traffic 24 and identifies network flows within the traffic. Each network flow represents a flow of packets in one direction within the network traffic and is identified by at least a source address, a destination address and a communication protocol. Flow analysis module 25 may utilize additional information to specify network flows, including source media access control ("MAC") address, destination MAC address, source port, and destination port. Other embodiments may use other information to identify network flows, such as IP addresses.

Flow analysis module 25 maintains data within flow table 35 that describes each active packet flow present within the network traffic. Flow table 35 specifies network elements associated with each active packet flow, i.e., low-level information such as source and destination devices and ports associated with the packet flow. In addition, flow table 35 may identify pairs of packet flows that collectively form a single communication session between a client and server. For example, flow table 35 may designate communication session as pairs of packet flows in opposite directions for flows sharing at least some common network addresses, ports and protocol.

Stateful inspection engine 28 inspects both client-to-server packet flows as well as server-to-client packet flows in order to more accurately identify the type of application and underlying protocol for each communication session. This may assist when, for example, a malicious user attempts to spoof (i.e., mimic) one type of application and instead use another in attempt to bypass an IDS. As an example, a malicious user may attempt to circumvent an IDS by spoofing an SMTP request when actually using the HTTP protocol. IDS 20 may determine from the response from the server that the original packet flow was just an attempt to bypass IDS 20 and may take appropriate action, such as dropping future packets associated with the packet flow and/or alerting the targeted device of the attack.

In the event a security risk is detected, stateful inspection engine 28 outputs alert 40 to security management module 44 for logging and further analysis. In addition, stateful inspection engine 28 may take additional action, such as dropping the packets associated with the communication session, automatically closing the communication session or other action. If no security risk is detected for a given application-layer communication session, forwarding component 31 continues to forward the packet flows between the peers. Forwarding component 31 may, for example, maintain a routing table that stores routes in accordance with a topology of the enterprise network for use in forwarding the packet flows.

Finally, main memory 48 includes patch management module 50, which includes program code to manage the installation, execution, and, if necessary, the rollback of a security patch for IDS 20.

IDS 20 also includes memory store 46, a computer-readable storage medium. By way of example, and not limitation, such computer-readable media can comprise random-access memory (RAM), read-only memory (ROM), electrically-erasable programmable read-only memory (EEPROM), flash memory, compact disc read-only memory (CD-ROM), optical disk storage, magnetic disk storage or other magnetic storage devices, or any other medium that can be used to store desired program code in the form of instructions or data structures and that can be accessed by an embedded microprocessor. Storage media may store the executable software instructions in the form of computer program products.

Memory store 46 stores firmware for IDS 20. The device loads firmware from memory store 46 into main memory 48 for execution by the device.

Figure 3A:
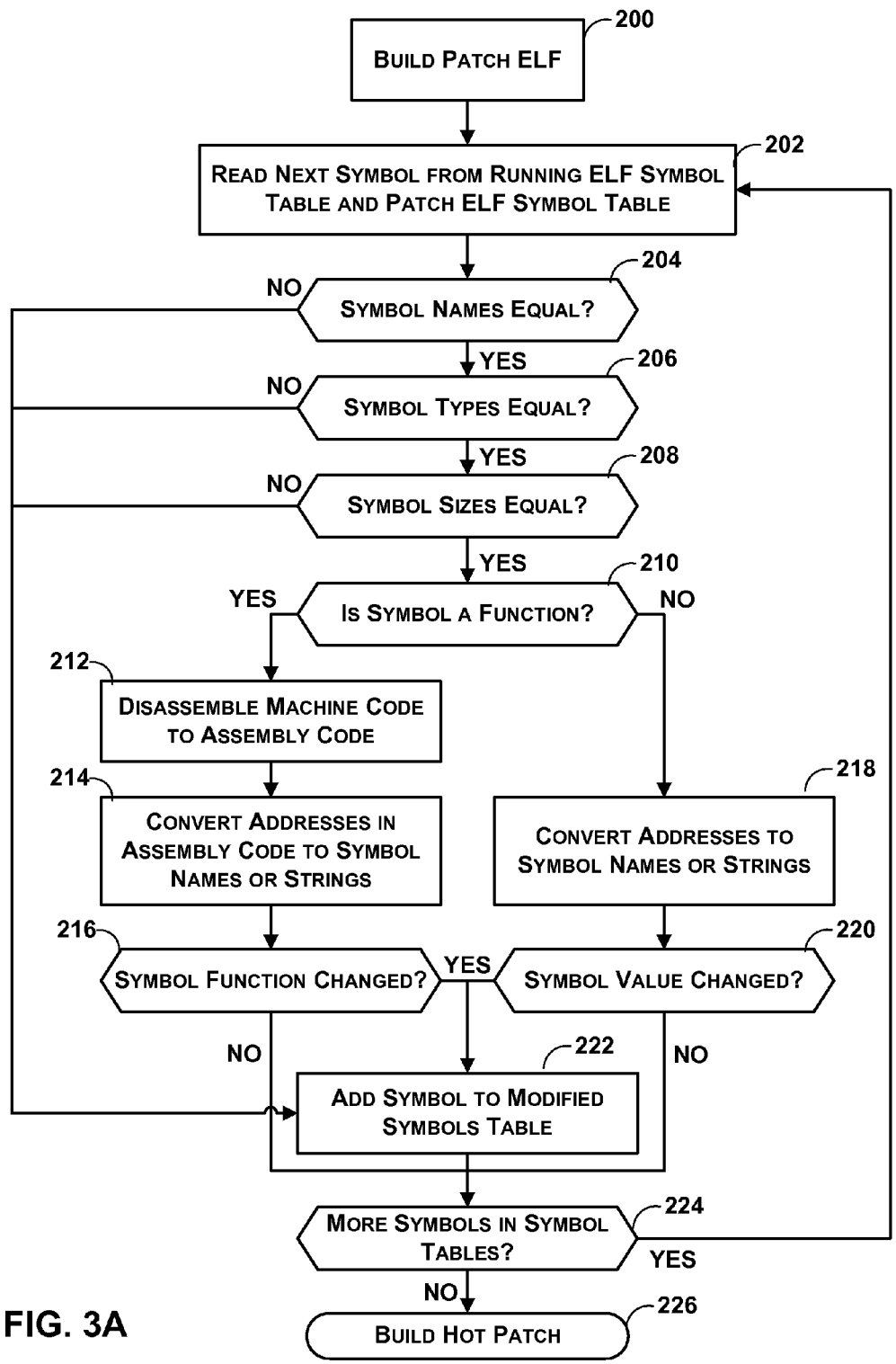
FIGS. 3A-3B are flowcharts illustrating an exemplary process for generating a hot patch.
Figure 3B:
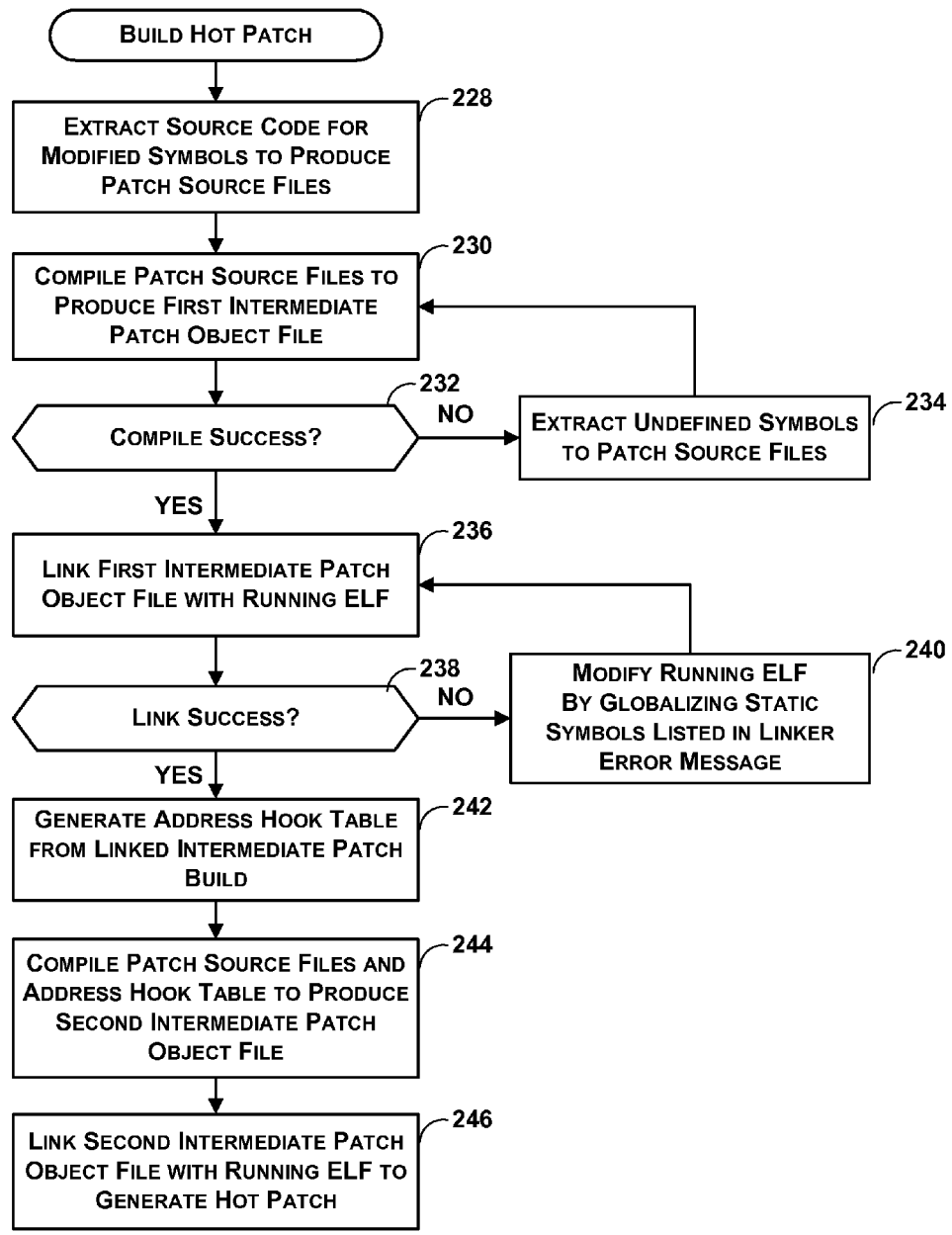

FIGS. 3A-3B are flow charts illustrating an exemplary process for generating a hot patch in accordance with the principles of the invention. For illustrative purposes, the flowcharts of FIGS. 3A-3B are described in reference to the intrusion detection system 20 of FIG. 2.

Memory store 46 of IDS 20 stores a firmware file that, in this example, exists in an executable and linkable format (ELF), a standard file format for executables, object code, and shared libraries. Although the invention is described with respect to the ELF format, its principles apply to other formats that permit symbol analysis, such a DOS executable, Windows portable executable, ECOFF, XCOFF, universal binary, .NET assembly, and others.

During the boot sequence of the IDS 20, the IDS loads the firmware file into main memory 48 for execution. A firmware file identical to that executing on IDS 20 will hereinafter be referred to as the running ELF. The running ELF therefore includes the firmware currently executing on IDS 20 and all other identical firmware on other devices or media.

Initially, software developers become aware of a vulnerability in the running ELF, typically in response to customer reports or their own internal testing. Using a development environment or other means, the developers identify the source of the vulnerability in the source code for the running ELF, modify the source code to close the vulnerability, and rebuild the firmware from the newly modified code (200). The rebuilt firmware program is a modified version of the running ELF and will hereinafter be referred to as the patch ELF.

A hot patch generator uses the running ELF and the patch ELF to create the hot patch. Both the running ELF and the patch ELF include a symbol table that may be generated by a compiler when each program is built from its respective source code. Symbols represent functions and data for the program and are primarily used by a linker to link multiple object files together but are also helpful during debugging. The symbol table contains a list of records for the various symbols representing functions and data within the program. These records typically include, among other things, the symbol name, type, size, and value. The symbol type is generally either "function" or "object," whereas size refers to the number of bytes represented by the symbol. For example, a 4-byte integer object has a size of 4, while a function containing numerous instructions may encompass many hundreds of bytes. A symbol value denotes its address.

Even a small modification to the source code for the running ELF made to close a vulnerability will cause changes to its symbol table, for any change will alter the addresses of the symbols and thus of the symbol values. For example, if additional instructions are added to a function, the location of the next function in the address space must be changed to accommodate the additional memory used by those instructions. Furthermore, changes to the symbol name and type are possible. For functions especially, modifications will increase or decrease the size of the symbol. The process of generating a hot patch, broadly described, requires determining the differences between the symbols of the running ELF and the patch ELF, extracting those differences to an intermediate file, and then linking the intermediate file to the running ELF.

At the start of the hot patch build process, the hot patch generator reads the first symbol record from the running ELF symbol table and the corresponding symbol record from the patch ELF symbol table (202). It compares the name (204), type (206), and size (208) characteristics of the two records; if any of these characteristics for the symbol vary from the running ELF to the patch ELF, the hot patch generator adds the symbol to a modified symbols table for later use. If a symbol was newly added during the process of modifying the running ELF source code, that symbol in the patch ELF symbol table will not have a corresponding symbol in the running ELF symbol table. In that case, the symbol is immediately added to the modified symbols table. If, however, the symbol is not new and neither the name, type, nor size of the symbol have changed, the hot patch generator next compares the respective content of the program code represented by the running ELF and patch ELF symbols.

First, the hot patch generator determines whether the symbol is of type function (210). If not, the generator converts the value at the address (found in the value field of the symbol record) of the object symbol to a symbol name (218). This may be done for both the running ELF and patch ELF symbols. The value at the address for many of the object symbols will often be a string or an address for another symbol, such as a function or other reference. Because modifications to the source code for the running ELF may have the effect of altering a number of the symbol addresses, converting the value at the address for an object symbol to its corresponding symbol name permits the hot patch generator to determine whether an actual change was made, or whether the difference in values is merely an artifact of changes to the symbol addresses generally. The hot patch generator converts the values at the address of the object symbol to a symbol name by searching the symbol table of the appropriate ELF. If the hot patch generator finds that the value matches the address for a particular symbol, the generator converts the value to that symbol's name plus an offset of zero or more. For example, for a typical if-else condition, the address may not be at the beginning of the symbol but at a location inside the symbol's memory range. Further, if the generator does not find a match for the value, it searches the string sections of the appropriate ELF (e.g rodata.str1.4) for the address, and converts the address to a string. For example, a data structure may be defined by struct a={0, "this is a string"}. In this case, the data structure a contains an address for the string, but the symbol table may not include the specific address since the string itself does not have a corresponding symbol. As a result, the generator searches the string section for the address to retrieve the string "this is a string" for purposes of comparison. If the generator also fails to find a match for the value within the string section, the generator creates a unique string value to use instead.

After the conversion of the values for the running ELF and patch ELF symbols to symbol names, the hot patch generator compares the symbol names (220). If they are different, the symbol value has changed and the symbol is added to the modified symbols table (222).

For example, given functions A and B, located at addresses 10 and 20, and an object D that references function B, the value at the address in the symbol D record in the running ELF is 20. Upon modification of function A, function B is relocated to address 24 in the patch ELF. Direct comparison of the respective values at the address of object symbol D would indicate a change in the symbol from the running ELF to the patch ELF. However, the object symbol D still references function B in both ELF. By converting the values from addresses to the name of the symbol, "B", the hot patch generator is able to determine that object symbol D references the same symbol in both ELF files and has not been altered in any important respect.

If the symbol is of type function, rather than type object, the hot patch generator determines, for each ELF, the address for and size of the represented function from the symbol record. The generator then disassembles the binary code that comprises the function instructions in the respective ELF (212). That is, the generator translates the binary code at the address from machine language to assembly language, which permits the use of symbols in place of addresses. The running ELF is disassembled into running assembly code, while the patch ELF is disassembled into patch assembly code. Using a process similar to that described above with respect to object symbol evaluation, the hot patch generator converts addresses in the assembly code to symbol names (214). That is, for both the running assembly code and the patch assembly code, the generator looks up the addresses in the symbol table for the appropriate ELF and replaces the address with the symbol name having that address as a value. The hot patch generator then performs a comparison between the modified running assembly code and the modified patch assembly code (216). If the comparison reveals a difference, the function represented by the symbol has changed and the symbol is added to the modified symbols table (222).

Having finished analyzing the first symbol in the symbol table for changes from the running ELF to the patch ELF, the hot patch generator determines whether additional symbols remain in the symbol tables and, if so, iterates the steps recited above with respect to each additional symbol until no further symbols remain (224).

Once all of the symbols in the symbol table have been analyzed (No of 224), the modified symbols table contains a list of all added symbols and all symbols that have changed as a result of modifications to the source code made to close the vulnerability. The hot patch generator then proceeds to build the hot patch (226 and FIG. 3B) by first extracting these added or modified symbols from their original source files to create patch source files (228). For a symbol that is of type function, for example, the source code for the function, including the function header and body, is copied from the original source file to a patch source file. Compiler directives and function prototypes for added/modified symbols, if present in an original source files, are also copied to the corresponding patch source file to permit compiling. Generally, each original source file used to build the patch ELF and containing one or more added or modified symbol will have a corresponding patch source file comprising the added or modified symbols, compiler directives, and function prototypes.

After the patch source files are generated from the extracted symbols, they are compiled (230). In some cases, the modified symbol functions will contain certain dependencies for which the dependency source code (not merely its function prototype) may be needed to properly compile. For example, a compiler or programmer may direct a static function called by a modified function to be inlined. During compilation, this will generate an error if the dependency has not been extracted to a patch source file and the compiler is not able to resolve it. That is, the symbol for the dependency is undefined.

If the compile fails (232), the patch generator analyzes the compile error log, extracts any undefined symbols from the original source files to a patch source file (234), and again attempts to compile the patch source files (230). This process continues until compilation is successful (232), whereupon the hot patch generator links the compiled files into a first intermediate patch object file, PATCH_FIRST.O.

Hot patch generator links PATCH_FIRST.O with the running ELF (236). This process will generate errors where the added or modified symbols reference static symbols as defined in the original source files (238). Because static symbols in an ELF file are given local scope, they cannot be linked with symbols outside of that scope, such as those found in PATCH_FIRST.O. To resolve this issue, hot patch generator modifies the running ELF by globalizing any static symbols listed in the link error log (240). The hot patch generator then relinks PATCH_FIRST.O with the running ELF. If successful, linking results in a new executable, PATCH_MERGE.

The hot patch generator then proceeds, using a modified complier, to create an address hook table (242) and a function hook table. The address hook table, illustrated in FIG. 5A and described in additional detail below, is a data structure having entries that comprise, for each modified symbol, four fields: address, end address, original code, and new code. The address field refers to the location of the corresponding original symbol in both running ELF and PATCH_MERGE. The end address field refers to the location of the last instruction or portion of a data region for the corresponding original symbol in both running ELF and PATCH_MERGE. The original code field contains the original instruction at the address in the address field. The new code field, upon completion of the address hook table, contains a new instruction that patch management module 50 of IDS 20 uses to replace the original code at its address in memory. In some embodiments, the original and new code fields may contain more than one instruction.

To populate the fields for each modified symbol entry, the hot patch generator analyzes PATCH_MERGE to determine the address of the modified symbol linked from PATCH_FIRST.O, as well as the address and end address of the corresponding original symbol linked from running ELF. It inserts the address and end address of the original symbol into the address and end address fields, respectively, in the proper address hook table entry. In addition, it inserts the original code, found at that address of the original symbol, from PATCH_MERGE into the original code field. Finally, the generator inserts new code in the new code field. For symbols of type object, the new code is typically an address or other value and not an instruction. In such a case, the new code may be simply determined by searching PATCH_MERGE for the value at the address of the modified symbol. For symbols of type function, however, the new code is typically a jump instruction and must be generated. The target of the jump instruction is the address of the modified symbol in PATCH_MERGE. The hot patch generator combines the target address with a generic jump instruction to produce the new code, which it then inserts into the new code field for the symbol.

For example, the address OLD_ADDR and end address OLD_ADDR_END for any modified symbol in the running ELF can be determined by reading the map file of the running ELF. Reading the memory at the address, OLD_ADDR, from the running ELF provides the eight bytes of code (OLD_DATA1, OLD_DATA2) at the beginning of that symbol. The new address NEW_ADDR of the same symbol is determined by reading the map file of PATCH_MERGE. For different types of processors, different instructions are used to generate the jump code.

For example, for Intel IA32 processors the hot patch generator uses:
push $(NEW_ADDR); ret;
For PowerPC, the hot patch generator uses:
ba NEW_ADDR;
For ARM, the hot patch generator puts the NEW_ADDR right after the code: ldr pc, [pc, #-4] to make an absolute branch:
ldr pc, [pc, #-4];
Then, the assembly code is compiled to binary code for each CPU, which is read as one or two integers into the address hook table:
addr_hooks[ ]={
{OLD_ADDR, OLD_ADDR_END, OLD_DATA1, OLD_ DATA2, BINARY_CODE1, BINARY_CODE2/* for arm, BINARY_CODE2 is the NEW_ADDR */}; }
After the fields for all modified symbol entries in the address hook table have been populated, the hot patch generator creates a new address hook table source file in which to embed the contents of the table. It then compiles all of the patch source files and the address hook table source file to generate a second intermediate patch object file, PATCH_SECOND.O (244). Finally, the generator links PATCH_SECOND.O with the running ELF to produce a hot patch (246). As part of this final step in the generation process, the address hook table may be linked to patch management module 50 in the running ELF for IDS 20, which uses the address hook table to modify the running ELF in main memory 48 of IDS 20 to redirect the function call chain to the modified symbols. Memory space in the running ELF of IDS 20 has been reserved for the address hook table so that, in the event a patch is loaded, the running ELF can access the address hook table directly.

FIG. 4A is a block diagram illustrating a very simple, exemplary memory map for main memory 48 of the IDS 20 of FIG. 2. The memory map is populated when IDS 20 loads the running ELF file from memory store 46, e.g., at an initial booting of the device. The memory map contains global data members GLOBAL_DATA_1, GLOBAL_DATA_2, and GLOBAL_DATA_3, in addition to FUNCTION_A, FUNCTION_B, and FUNCTION_C. Hot patch reserve 311 is memory space specially reserved for future hot patches. Memory space 312 typically contains data sections for the running ELF, while hot patch data reserve 313 is reserved as the data section for the hot patch. The remaining memory 314 will typically be used for the stack, the heap, and other purposes.

FIG. 4B is a block diagram of an exemplary hot patch, generated by the process illustrated in FIGS. 3A-3B, for the running ELF represented in the memory map of FIG. 4A. In this example, as a consequence of a vulnerability fix for the firmware of IDS 20, GLOBAL_DATA_3, FUNCTION_B, and FUNCTION_C were modified in the source code for the running ELF. The hot patch therefore contains GLOBAL_DATA_3_PATCH, FUNCTION_B_PATCH, and FUNCTION_C_PATCH, as well as address hook table 322 and function hook table 324.

GLOBAL_DATA_3_PATCH may contain a value that represents an address for another variable or function, a data member initializer, or some other value. FUNCTION_B_PATCH and FUNCTION_C_PATCH are modified functions for FUNCTION_B and FUNCTION_C, respectively. The patch functions comprise instructions that do not include the one or more vulnerabilities of IDS 20 posed by the original functions.

Function hook table 324 is a data structure comprising a list of hooks (or pointers) to custodial functions in the hot patch of FIG. 4B. As explained in detail below, patch management module 50 may use the hooks in the table to invoke these functions in order to deallocate memory, unload device drivers, or perform other services, during or after a patch rollback.

FIG. 5A is a block diagram illustrating, in detail, the address hook table 322 of FIG. 4B. The address hook table contains entries for each of the symbols in the memory map illustrated by FIG. 4A that are to be modified using the hot patch of FIG. 4B. For example, there is an entry for FUNCTION_B, which corresponds to the FUNCTION_B_PATCH in the hot patch of FIG. 4B. Entries for each symbol comprise four fields: address, end address, original code, and new code. Each field may comprise one or more bytes of data or code. The address field refers to the location of the unmodified symbol in the memory map of FIG. 4A. For instance, the address field for the FUNCTION_B entry in address hook table 322 has a value of 0x0B14, which corresponds to the location of FUNCTION_B in the memory map. The end address field refers to the location of the last instruction or portion of a data region for the unmodified symbol.

The original code field contains the data value, address, or instruction at the address value for the memory map contained in the address field. In some embodiments, the original code field may contain more than one instruction. For object symbols, the value of the original code field is generally a data value or address. For function symbols, the field typically contains the first instruction of a function. As shown in address hook table 322, the original code field entry for FUNCTION_B contains an abstract representation of the first instruction for FUNCTION_B, located at address 0x0B14.

Finally, the new code field contains the data value, address, or instruction that may be used by patch management module 50 to replace the original code at the address value for the memory map contained in the address field. In some embodiments, the original code field may contain more than one instruction. For instance, in the Intel IA32 processor example provided above, the hot patch generator produces two instructions, push $ (NEW_ADDR) and ret, to perform the jump function. When the hot patch is activated, the patch management module substitutes, at the address found in the address field, the value in the original code field with the value in the new code field for both object and function symbols.

FIG. 5B is a block diagram illustrating, in the limited context of FUNCTION_B, the changes to the memory map of FIG. 4A resulting from activation of the hot patch of FIG. 4B. FUNCTION_B has its original first instruction at address 0x0B14. When the hot patch is loaded from memory store 46 into main memory 48, FUNCTION_B_PATCH may be loaded at a particular address. As part of the activation process, patch management module 50 replaces the original first instruction with the new code in the entry for FUNCTION_B in address hook table 322. The new code is a jump instruction having as its target the address of FUNCTION_B_PATCH. As a result, when FUNCTION_B is called during execution of the running ELF, the execution thread is redirected to FUNCTION_B_PATCH, the modified symbol.

A hot patch built according to the exemplary process illustrated in FIGS. 3A-3B is typically installed manually onto IDS 20 by an administrator wielding a non-volatile memory source, but it may also be pushed to the IDS via enterprise network 5 from a network source. While IDS 20 is executing the running ELF, the hot patch may first be copied to memory store 46 from the source. The administrator then executes the hot patch, which causes patch management module 50 to load the hot patch from the memory store to main memory 48. As noted above, the running ELF occupying main memory maintains a reserve area specifically for future hot patches. The hot patch is loaded into this portion of the memory.

The administrator then activates the hot patch. Upon activation, patch management module 50 first halts certain interrupts; these result in uncertainties in the execution thread and may cause errors during the activation process if they remain enabled. Patch management module 50 also checks the stack for all processes to see if any process is currently running between the address and end address of the symbol to be patched. If that is the case, patch management module 50 defers the patch activation until the patch can be applied to all processes. Then, patch management module 50 reads address hook table 322. For each symbol entry in the table, the patch management module finds the memory address for the address field of the entry. If the value at the memory address matches the value in the original code field of the entry, the patch management module copies the value in the new code field of the entry to the memory address. For function symbols, this will cause the function call chain to redirect to the function in the hot patch that corresponds to the original function symbol. Finally, patch management module 50 enables the previously halted interrupts to return IDS 20 to normal operation.

IDS 20 is able to continue running during the entire hot patch loading and activation process, averting the downtime and loss of service that may be intolerable for critical systems. And as a result of hot patch activation, the execution thread no longer enters vulnerable functions in the original running ELF. Rather, the thread enters the corresponding modified functions in the hot patch.

The hot patch may be one of several different hot patches present on IDS 20, and each hot patch can be designated as one of several states: Init (i.e., not yet loaded into memory), Deactivated, Activated, and Confirmed. These states determine the operation of IDS 20 with regard to the hot patch in the event of device reboot. Regardless of the state, upon reboot the device loads the original running ELF into main memory 48. Then, if the hot patch has been loaded into memory store 46 and designated to be in the "activated" state, patch management module 50 loads the hot patch from memory store 46 into main memory 48. To activate a hot patch in the activated state, an administrator must take the additional step of executing an activate command.

In many cases, an administrator may wish to test the efficacy of a hot patch for a period of time before committing it to IDS 20 as part of its standard operation. When the administrator is satisfied that the hot patch does not cause undesirable or unsafe operation, he will set the hot patch state to "confirmed." If the hot patch is in the confirmed state, upon reboot, patch management module 50 not only loads the hot patch into main memory 48, it automatically activates the hot patch. That is, it reads address hook table 322 and replaces the original code at the specified addresses with the new code, thus automatically redirecting the execution thread to the modified functions within the hot patch.

In some cases, the administrator may be dissatisfied with the operation of the hot patch and deactivate it by issuing a deactivate command and designating the hot patch as in the "deactivated" state. In this case, the hot patch is loaded into main memory 40 upon reboot but remains in the deactivated state.

The structure of the hot patch enables the administrator to "roll back" an activation at run time, thereby restoring the original running ELF. A command from the administrator to IDS 20 to deactivate a hot patch causes patch management module 50 to perform the reverse of the activation operation. After disabling certain interrupts and checking the stack for all processes to see if any process is currently running between the address and end address of the symbol to be patched, for each symbol entry in address hook table 322, the patch management module reads the memory at the address in the address field. If the value of that memory matches the value for the new code field in the entry, the patch management module replaces the new code with the original code maintained in the address hook table. In addition, the patch management module may call a custodial function for a newly restored symbol.

As mentioned above, function hook table 324 is a data structure comprising a list of hooks (or pointers) to custodial functions in the hot patch of FIG. 4B. In some cases, a function symbol may use certain system resources that are costly to claim and/or initialize (e.g., memory and devices). Typically, an initialization function for such a function is called prior to executing that aspect of the function that requires the system resource. The resource having been claimed, repeated invocation of the function will not require additional calls to the initialization function. However, these claimed resources must be released when they are no longer required by the function. This is the task of the custodial functions. During the deactivation process, patch management module 50, after restoring each symbol, determines whether there is a function hook to a corresponding custodial function for that symbol in function hook table 324. If so, patch management module 50 uses the function hook to invoke the custodial function and release any system resources allocated expressly for use by the function symbol.

After all symbols have been restored and unneeded system resources released, the patch management module re-enables interrupts. The consequence of these deactivation operations is the restoration of the original running ELF in main memory 48 on IDS 20 and the concomitant reversion of its operation. The administrator has the additional options of unloading the hot patch from main memory 48 and deleting the hot patch file from memory store 46.

Various embodiments of the invention have been described. These and other embodiments are within the scope of the following claims.

The invention claimed is:

1. A method executed by a processor comprising:
identifying individual symbols within an updated version of embedded system firmware and corresponding symbols within a prior version of the embedded system firmware, wherein the symbols specify variables or functions used within the firmware, wherein identifying comprises:
   reading a record from a symbol table of the prior version, wherein the record describes one of the symbols within the prior version of the embedded system firmware; and
   reading a record from a symbol table of the updated version, wherein the record describes one of the symbols within the updated version of the embedded system firmware that corresponds to the symbol within the prior version;
determining differences between the updated version of the embedded system firmware and the prior version of the embedded system firmware by comparing the symbols within the updated version and the symbols within the prior version, wherein the updated version and the prior version of the embedded system firmware comprise executable machine instructions compiled from source code, wherein comparing comprises comparing the record of the symbol within the prior version and the record of the symbol within the updated version to determine whether the symbols have been modified; and
generating a software patch based on the determined differences, wherein generating comprises:
   extracting specific content from source code for the updated version of the embedded system firmware that causes the determined differences, wherein the specific content comprises source code for the symbol from the updated version source code when the symbol has been modified;
   compiling the extracted specific content; and
   building the software patch from the compiled specific content.

2. The method of claim 1, wherein identifying individual symbols and comparing the symbols within the updated version and the symbols within the prior version comprises:
reading a function or data for a variable specified by one of the symbols within the prior version of the embedded system firmware;
reading a function or data for a variable specified by one of the symbols within the updated version of the embedded system firmware that corresponds to the symbol within the prior version; and
comparing the function or the data for the variable specified by the symbol within the prior version and the function or the data for the variable specified by the symbol within the updated version to determine whether the symbol has been modified,
wherein the specific content comprises source code for the symbol from the updated version source code when the symbol has been modified.

3. The method of claim 2, wherein when the symbol within the updated version specifies a variable, comparing the function or the data for the variable specified by the symbol within the prior version and the function or the data for the variable specified by the symbol within the updated version further comprises:
converting a value at a memory address in the data for the variable specified by the symbol within the prior version and a value at a memory address in the data for the variable specified by the symbol within the updated version to symbol names; and
comparing the converted symbols names within the data for the variable specified by the symbol within the updated version and the converted symbols names within the data for the variable specified by the symbol within the prior version.

4. The method of claim 2, wherein when the symbol within the updated version specifies a function, comparing the function or the data for the variable specified by the symbol within the prior version and the function or the data for the variable specified by the symbol within the updated version further comprises:
disassembling the function specified by the symbol within the prior version and the function specified by the symbol within the updated version;
converting a value at a memory address in the disassembled function specified by the symbol within the prior version and a value at a memory address in the disassembled function specified by the symbol within the updated version to symbol names; and
comparing the disassembled function and converted symbol names specified by the symbol within the updated version and the disassembled function and converted symbol names specified by the symbol within the prior version.

5. The method of claim 1, wherein compiling the specific content comprises generating the embedded system firmware to include an address hook table having an entry for the symbol of the updated version, wherein the entry comprises a memory address of the symbol within the prior version of the embedded system firmware, the content at the memory address, and new content.

6. The method of claim 5, wherein when the symbol within the updated version specifies a variable, the new content for the entry in the address hook table is a value of the symbol within the updated version.

7. The method of claim 5, wherein when the symbol within the updated version specifies a function, the new content is one or more computer instructions that direct an execution thread of a computer processor of the embedded system to a memory address of the symbol within the updated version of the embedded system firmware.

8. The method of claim 7, wherein the new content is a plurality of computer instructions that direct the execution thread of the computer processor of the embedded system to the memory address of the symbol within the updated version of the embedded system firmware.

9. The method of claim 1, wherein compiling the specific content comprises:
- generating a custodial function for the symbol within the updated version of the embedded system firmware when the symbol is either new or modified; and
- generating a function hook to the custodial function.

10. The method of claim 1, wherein comparing records further comprises comparing any one of the names, types, or sizes of the symbols.

11. The method of claim 1, wherein building the software patch from the compiled specific content comprises linking the compiled specific content to the prior version of the embedded system firmware.

12. The method of claim 1, wherein identifying individual symbols and comparing the symbols within the updated version and the symbols within the prior version comprises:
- reading a record from a symbol table of the updated version, wherein the record describes one of the symbols within the updated version of the embedded system firmware;
- comparing the record of the symbol within the updated version with a symbol table of the prior version of the embedded system firmware to determine if the symbol table of the prior version includes a record describing a symbol that corresponds to the symbol within the updated version; and
- where the symbol table of the prior version does not include the record describing the symbol that corresponds to the symbol within the updated version, determining that the symbol within the updated version is new,
- wherein the specific content comprises source code for the symbol from the updated version source code when the symbol is new.

13. A non-transitory computer-readable storage medium comprising instructions for causing a programmable processor to:
- identify individual symbols within an updated version of embedded system firmware by reading a record from a symbol table of a prior version of embedded system firmware, wherein the record describes a symbol within the prior version of the embedded system firmware;
- identify corresponding symbols within a prior version of the embedded system firmware by reading a record from a symbol table of an updated version of the embedded system firmware, wherein the record describes a symbol within the updated version of the embedded system firmware that corresponds to the symbol within the prior version;
- determine differences between the updated version of the embedded system firmware and the prior version of the embedded system firmware by comparing the record of the symbol within the prior version and the record of the symbol within the updated version to determine whether the symbol has been modified;
- extract specific content from source code for the updated version that causes the determined differences, wherein the specific content comprises source code for the symbol from the updated version source code when the symbol has been modified;
- compile the extracted specific content;
- generate an address hook table having an entry for the symbol, wherein the entry comprises a memory address of the symbol within the prior version of the embedded system firmware, the content at the memory address, and new content; and
- build a software patch from the compiled specific content and address hook table.

\* \* \* \* \*